3,113,792
PIPE UNION WITH SEPARABLE FLANGE FOR NUT

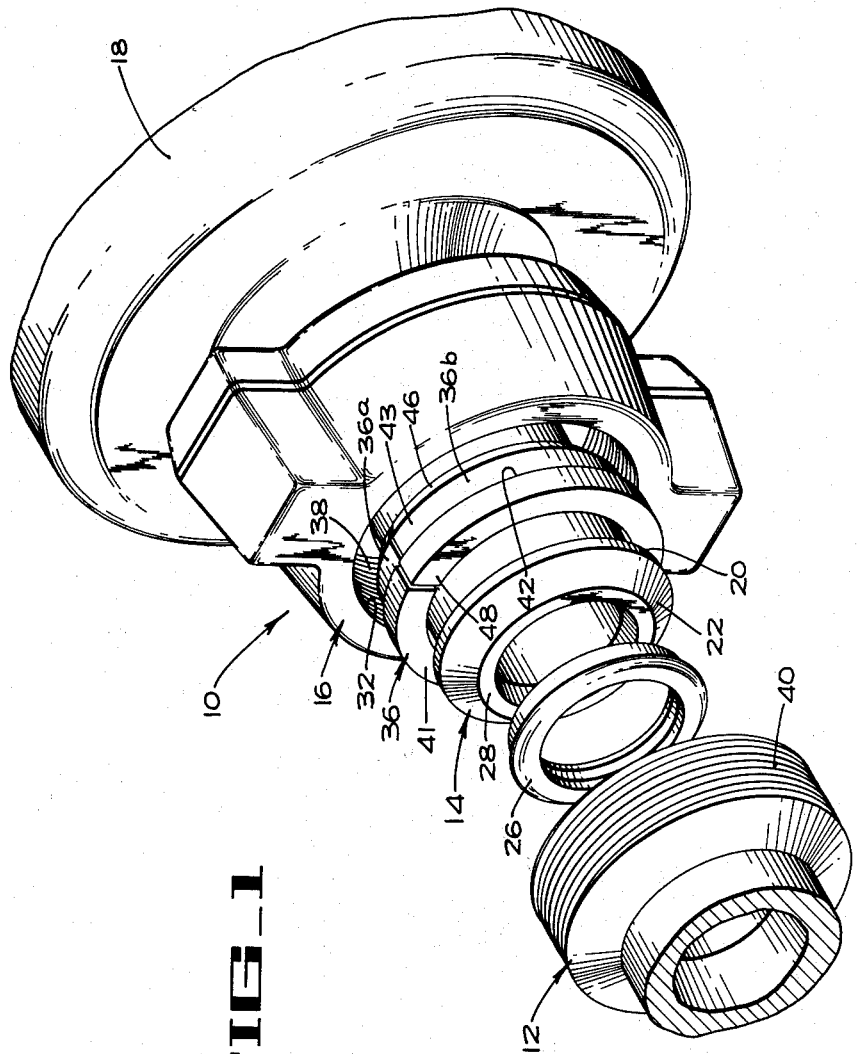
FIG_1

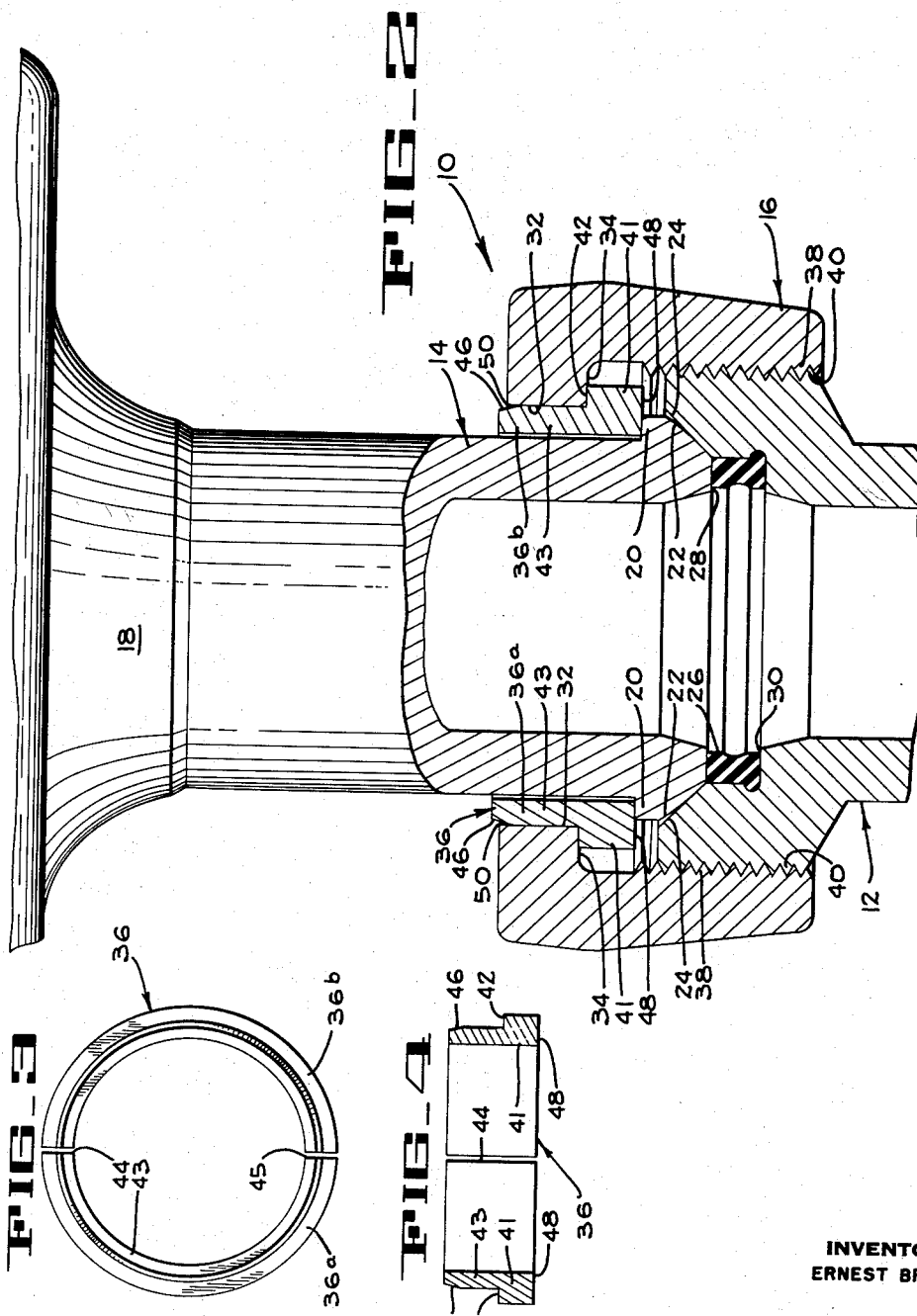

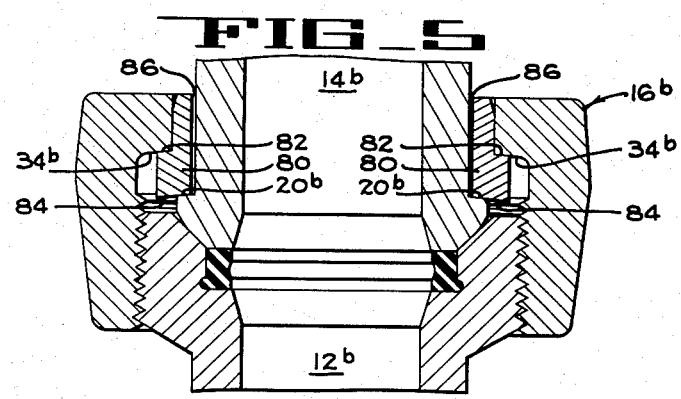
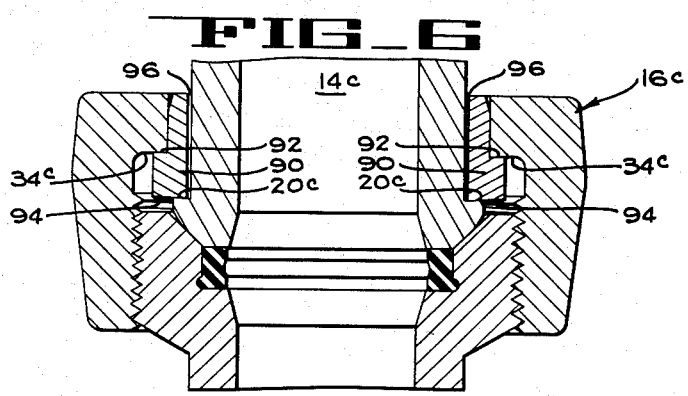

Ernest Brown, Houston, Tex., assignor, by mesne assignments, to FMC Corporation, San Jose, Calif., a corporation of Delaware
Filed Feb. 16, 1960, Ser. No. 8,966
1 Claim. (Cl. 285—354)

This invention relates to pipe fittings and more particularly to pipe unions.

An object of the invention is to provide an improved pipe union.

Another object is to provide a pipe union having a connecting nut that is removable.

Another object is to provide an improved device for retaining the connecting nut on one of the coupling members of a pipe union.

These and other objects and advantages of the invention will be apparent from the description and accompanying drawings in which:

FIGURE 1 is an exploded perspective of one embodiment of the pipe union of the invention.

FIGURE 2 is an axial section of the pipe union illustrated in FIG. 1.

FIGURE 3 is an end elevation on a reduced scale of a two-piece retainer for the union nut illustrated in FIGS. 1 and 2.

FIGURE 4 is an axial section of the retainer illustrated in FIG. 3.

FIGURE 5 is an axial section of a second embodiment of the invention.

FIGURE 6 is an axial section of a third embodiment of the invention.

Conventional pipe unions comprise a tubular male member, a threaded tubular female member, and a threaded nut which abuts a shoulder on the male member and can be screwed onto the female member to secure the members together. The nut cannot pass over the shoulder of the conventional male member and therefore must be assembled over the opposite, unshouldered end of that member. Consequently, a union of conventional design cannot be made with the male member machined as an integral part of a valve body or at each end of a length of pipe, for example, because with conventional unions, the nut cannot be assembled over the shouldered end of the male member. Conventional unions are therefore limited to use in the small number of situations where the union can be assembled by slipping the nut over the unshouldered end of the male member.

The structure according to the invention provides greatly increased piping adaptability by providing means whereby a union nut can be slipped over the shouldered end of the male member of a pipe union. The nuts are therefore detachable and by keeping nuts of different thread types on hand a male member can be connected to a particular one of several differently threaded female members without difficulty. Cost savings are also achieved because nuts can be removed from unions not in use and taken where they are needed. Cost savings are achieved, and piping is made adaptable to a wider range of installations, by the invention because it makes it possible to fabricate the male member of a union as an integral part of a valve body or at each end of a length of pipe.

One form of a union 10 (FIGS. 1 and 2) according to the invention comprises a female union member 12, a male union member 14 and a nut 16. The male member 14 is shown in FIGS. 1 and 2 as an integral part of a valve body 18, with the understanding, however, that the union 10 serves the purposes of the invention equally well when the male member 14 is attached to one end of any tubular member of such a nature that sliding the nut 16 on or off the opposite end thereof is difficult or impossible. The male member 14 (FIGS. 1 and 2) is formed with an annular, radially outwardly projecting shoulder 20 adjacent its distal end. The shoulder 20 is formed with an axially outwardly facing abutment face. A slightly convex (see FIG. 2) tapered surface 22 on the distal end is adapted to engage and seal against a cooperating straight flared surface 24 on the female member 12. When the sections are assembled a seal ring 26 of resilient material is inserted between an end surface 28 of the male member and an opposite surface 30 on the female member.

The nut 16 has a circular opening or bore 32, the diameter of which is slightly larger than the diameter of the shoulder 20 of the male member 14. The nut can therefore be readily slipped on and off of the male member 14. The nut 16 is formed with an inner shoulder 34 which is formed with an axially inwardly facing abutment face that is adapted to engage a two-piece retainer 36 (FIGS. 1–4). Threads 38 in the attachment portion of the nut engage threads 40 on the female member 12 and as the nut draws the two members of the union together, a radially projecting flange 41 on the two-piece retainer is confined between the male shoulder 20 of the male member 14 and the shoulder 34 of the nut 16, and provides a flat, or planar, secondary shoulder 42 against which the nut is tightened when the union 10 is "made up" to interconnect the tubular members whereon the members 12 and 14, respectively, of the union are mounted.

The two-piece retainer 36 (FIGS. 3 and 4) is constructed of steel and is in the form of a short cylinder split lengthwise by diametrically opposed milled slots 44 and 45 in the side walls. The shank portion 43 of the retainer 36 i.e., the part that is to be received within the bore 32 of the nut 16, is originally machined to a larger diameter than the diameter of the bore 32. When the two halves or sections 36a and 36b of the two-piece retainer are assembled behind the shoulder 20 on the male section, but before the nut 16 is forced onto them, the surfaces of the retainer which define the slot 44 and the slot 45, respectfully, abut each other and the assembled retainer 36 thus assumes a slightly elliptic shape. The major and minor diameters of the ellipse differ in length by the width of one of the milled slots, 44 or 45. The major diameter is longer than the diameter of the bore 32 while the minor diameter is shorter than the diameter of the bore 32. Assembly of the two-piece retainer into the nut is facilitated by machining a tapered surface 46 (FIG. 4) on the end of both halves.

During assembly of the union the flat end surfaces 48 on the two halves of the two-piece retainer engage the shoulder 20, and as the nut is tightened the elliptically shaped shank portion 43 of the two-piece retainer 36 is forced into the bore 32 of the nut where it assumes substantially the shape of a cylinder. This confinement and consequent reshaping of the retainer halves cause each to be stressed and they accordingly exert a counter-force on the nut. This causes each half to be retained within the nut 16 when the nut is unscrewed from the female union section 12, thereby preventing loss of the parts of the retainer ring 36 in the event that the nut 16 is slipped back toward the valve body 18 after the nut 16 is released from the female member 12. However, the nut can be detached from the union 10 by first removing the two pieces of the retainer 36, since their engagement within the nut 16 is not so firm as to preclude their removal therefrom when desired.

The retainer 36 is made of such a length that, following assembly, the end having the tapered surface 46 extends past the back side of the nut and this end is thus exposed so that each half of the retainer can be tackwelded to the nut 16 as shown at 50 (FIG. 2). Tack-welding is optional but makes retention of the retainer halves within the nut more positive.

The union 10 is used in the same manner as a conventional union i.e., the two tubular members 12 and 14 are placed in abutment, the nut 16 is engaged with the female member 12 and screwed up tight, thereby drawing the two members 12 and 14 tightly together into fluid-tight interengagement.

The second embodiment (FIG. 5) and the third embodiment (FIG. 6) of a union having a detachable nut according to the present invention are distinguished by a two-piece elliptical retainer which is similar to the retainer 36 of the first embodiment (FIGS. 3 and 4), but which has sloping frusto-conical abutment surfaces which engage against correspondingly sloping shoulders of the nut 16 and of the male member 14 of the union, respectively.

The inner and outer abutment surfaces 82 and 84, respectively, of the two-piece retainer 80 (FIG. 5) of the second embodiment slope radially outward and toward the outer, or distal, end of the male coupling member 14b. The inner surface 82 engages a correspondingly sloping shoulder 34b on the nut 16b. The abutment surface, or outer end 84, on the retainer 80 is sloped approximately the same as the surface 82 and engages a correspondingly sloped shoulder 20b on the male member 14b. A small space 86 is provided between the inner surface of the retainer 80 and the outer surface of the male member 14b, and the sloping abutment surfaces 82 and 84 can thereby move slightly with respect to each other causing the parts, including the members 12b and 14b, to automatically centralize themselves with respect to the union central axis when the nut is tightened.

The inner and outer abutment surfaces 92 and 94, respectively, of the retainer 90 of the third embodiment (FIG. 6) slope in the opposite direction, i.e., radially outward and away from the outer end of the male member 14c of the union, and the shoulders 34c and 20c of the nut 16c and the male coupling member 14c, respectively are correspondingly sloped. A space 96 is provided between the inner retainer surface and the outer male member surface so that when the nut is tightened the sloping surfaces move with respect to each other, causing the parts to centralize about the central axis of the union.

While three embodiments of the present invention have been shown and described it will be understood that the device is capable of further modification and variation without departing from the principles of the invention and that the scope of the invention should be limited only by the scope and proper interpretation of the claim appended hereto.

As an example of such a further modification, rather than threads, the nuts could be provided with cam surfaces for engaging appropriate lugs on the female member. Cam and lug construction is well known and used where the connection between two pipes or other tubes must be made and broken very quickly.

The invention having been described, that which is claimed as new and desired to be protected by Letters Patent is:

A pipe union coupling for assembly on a coupling member extending from an enlarged end of said coupling member, which prevents assembly of the coupling from said enlarged end, comprising a pair of tubular separable coupling members for assembly to form a conduit, one of said coupling members having a shoulder formed thereon providing an axially outwardly facing abutment face, a nut for joining said coupling members end to end, said nut having an attachment portion for connection with the other coupling member and having a shoulder portion extending radially inward from said attachment portion to form an axially inwardly facing abutment face, said nut attachment portion having a major axial bore that terminates at the abutment face of said nut shoulder portion, said nut shoulder portion having an axial cylindrical bore therethrough the diameter of which is less than that of the major bore in said nut attachment portion and which is greater than the outside diameter of said one coupling member shoulder portion, and a two-piece retainer assembly disposed within and carried by said nut, said retainer assembly forming a flange disposed between said one coupling member abutment face and said nut shoulder portion abutment face, said retainer assembly having a nut gripping portion disposed within said shoulder bore, said nut gripping portion of the retainer assembly having a shank that projects axially outward from said retainer assembly flange, and wherein said shank presses firmly against the wall of the bore in the shoulder portion of the nut, the radially and axially outer end of said shank of the retainer assembly being tapered for facilitating entry of the shank into the nut shoulder bore, said retainer assembly in its unstressed state comprising two arcuate sections which when assembled in said nut shoulder bore lie in a circle, the diameter of the circle that contains the outer surface of the nut gripping portion of said retainer assembly in its unstressed condition being somewhat greater than the diameter of said nut shoulder bore, the arc subtended by each section being less than 180° in the unstressed condition so that when said retainer sections are fitted together in their unstressed state they form a generally elliptical assembly, the major external diameter of the ellipse formed by the exterior surfaces of said shanks in unstressed condition at a point just axially outward of said retainer assembly flange being greater than the diameter of said nut shoulder bore, the minor external diameter of said nut gripping portion taken normal to said major external diameter of said arcuate sections when in their unstressed condition being less than the diameter of said nut shoulder bore, the arcuate sections of said retainer assembly being deformed from their unstressed condition by said nut upon insertion into the nut with the ends of the arcuate sections being pressed together, and with the nut gripping portions of said retainer sections pressing firmly against the wall of said nut shoulder bore in the nut when the retainer assembly is in place in the nut, whereby said retainer will rotate with said nut upon disassembly.

References Cited in the file of this patent

UNITED STATES PATENTS

| | | |
|---|---|---|
| 798,865 | Bailey | Sept. 5, 1905 |
| 812,642 | Crombie | Feb. 13, 1906 |
| 918,843 | Glidden | Apr. 20, 1909 |
| 944,877 | Koschinski | Dec. 28, 1909 |
| 1,016,620 | Gapp | Feb. 6, 1912 |
| 1,100,630 | Toepperwein | June 16, 1914 |
| 1,232,129 | Wafer | July 3, 1917 |
| 1,675,808 | Kliss | July 3, 1928 |
| 2,310,250 | Melsom | Feb. 9, 1943 |
| 2,403,368 | Howard | July 2, 1946 |
| 2,427,260 | Cowles | Sept. 9, 1947 |
| 2,438,107 | Babbitt | Mar. 23, 1948 |
| 2,646,996 | Parmesan | July 28, 1953 |
| 2,648,557 | Stewart | Aug. 11, 1953 |

FOREIGN PATENTS

| | | |
|---|---|---|
| 388,080 | Great Britain | Feb. 23, 1933 |
| 807,719 | Great Britain | Jan. 21, 1959 |